Figure 1:
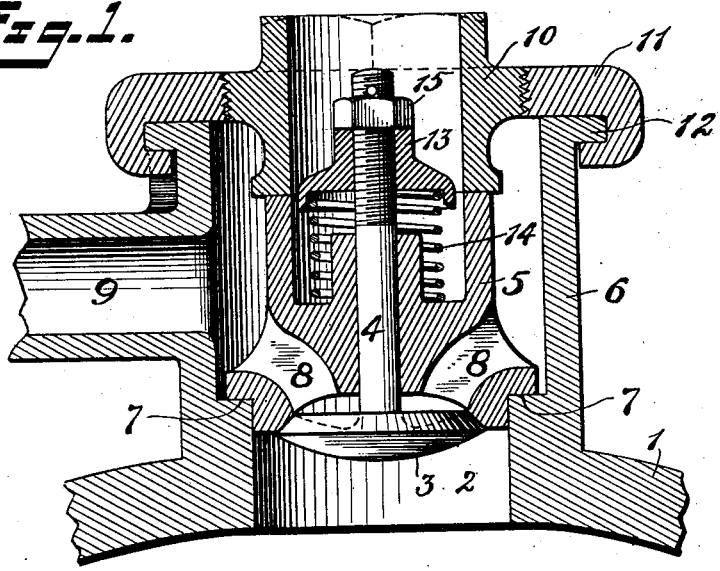

No. 754,569. PATENTED MAR. 15, 1904.
J. H. JONES.
ENGINE VALVE.
APPLICATION FILED JULY 10, 1903.
NO MODEL.

Witnesses
Geo. V. Rasmussen

Inventor
James H. Jones
By his Attorney

No. 754,569. Patented March 15, 1904.

UNITED STATES PATENT OFFICE.

JAMES H. JONES, OF BRISTOL, CONNECTICUT, ASSIGNOR TO THE CORBIN MOTOR VEHICLE CORPORATION, OF NEW BRITAIN, CONNECTICUT, A CORPORATION OF CONNECTICUT.

ENGINE-VALVE.

SPECIFICATION forming part of Letters Patent No. 754,569, dated March 15, 1904.

Application filed July 10, 1903. Serial No. 164,951. (No model.)

*To all whom it may concern:*

Be it known that I, JAMES H. JONES, a citizen of the United States, residing at Bristol, in the county of Hartford, State of Connecticut, have invented certain new and useful Improvements in Engine-Valves, of which the following is a full, clear, and exact description.

My invention relates to valves for internal-combustion engines.

The object of my invention is mainly to provide simple and effective mechanism to permit the valves of an internal-combustion engine to be readily attached or detached whenever desired. The construction is such that it is unnecessary to take down or loosen any of the piping in connection with the engine incidental to the insertion or removal of the valve.

The invention is applicable to both exhaust and intake valves; but in the drawings I have illustrated the same as applied to an intake-valve.

Figure 2:
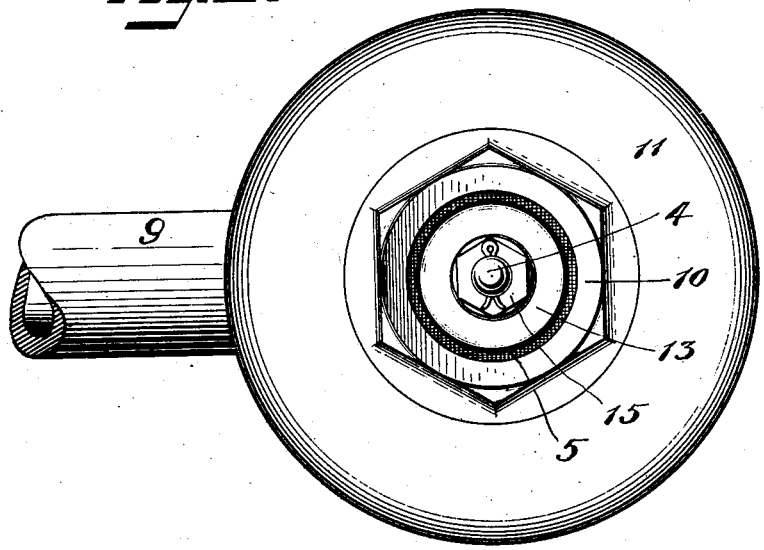

Figure 1 is a vertical sectional view of my invention. Fig. 2 is a plan view thereof.

1 conventionally represents a portion of an engine-cylinder or an extension thereof.

2 is a passage in which a valve 3 is located.

4 is the valve-stem.

5 is a removable frame which performs the function of supporting the valve and affording a seat therefor.

6 is a frame or housing extending from the part 1.

7 is a shoulder upon which the frame 5 rests when the parts are assembled. The joint between the frame 5 and the shoulder 7 is preferably ground or packed to form a gas-tight connection.

8 8 are gas-passages through the frame 5.

9 is a gas-pipe in connection with the frame or housing 6. 10 is a threaded nut, preferably hollow, the same taking into a threaded opening in a removable cover-plate 11 for said housing. The cover-plate may be secured to the housing by means of the well-known bayonet-joint (conventionally represented at 12) or in any other well-known manner.

13 is a collar which may be threaded on the valve-stem 4 and between which collar and the frame 5 may be located a spring 14.

15 is a check-nut which may be threaded on said valve-stem 4.

The assembling of the foregoing parts will be seen to be as follows: Assuming all of the parts are removed, the frame 5, which supports the valve 3, is first put in place, as indicated in Fig. 1, a portion of said frame taking a proper seat on the shoulder 7. The cover-plate 11 is then quickly put in place. The cover-plate 11 carries the nut 10, the end of which when the cover-plate is put on rests closely adjacent to the upper end of the frame 5. The operator then screws down said nut 10 until the frame 5 is forced into firm contact with the shoulder 7, forming a gas-tight joint. The valve 3 when it rests upon its seat completely closes the passage 2. If the valve is an intake-valve, such as shown in the drawings, suction may be relied upon to open it. The invention is equally applicable to mechanically-actuated valves whether the same are used as intake or exhaust valves. The opening through the nut 10 is preferably provided, because it gives access to the valve-stem 4 and the adjusting device or devices thereon. For example, in the drawings it will be seen that without removing the valve the adjusting devices may be changed so as to vary the tension of the spring 14. A decided advantage is attained by making the clamping parts 10 and 11 independent and separate in that it is unnecessary to revolve the cover-plate 11 in firmly setting the valve-carrying frame 5 upon its seat or in effecting the adjustment of said spring.

What I claim is—

1. In a device of the character described, a valve, a frame carrying the same, a seat for said valve, a seat for said frame, and means to hold said valve-frame to its seat said means comprising a removable plate and a separate nut threaded therein one of said parts being adjustable.

2. In a device of the character described, a valve, a frame carrying the same, a seat for said valve, a seat for said frame, and means to hold said valve-frame to its seat said means comprising a removable plate and a separate nut threaded therein said nut being adjustable independently of said plate.

3. In a device of the character described, a valve, a frame carrying the same, a seat for said valve, a seat for said frame, and means to clamp said valve-frame to its seat, said clamping means comprising a removable member 11 and a second member 10 rotatably carried by said member 11, and means for moving one of said parts longitudinally by rotation, the member 10 exerting a pressure against said frame in the direction of its seat.

4. In a device of the character described, a valve, a skeleton frame carrying the same, a seat for said valve formed on said frame, a seat for said frame and means to clamp said valve-frame to its seat, said clamping means comprising a removable member 11 and a second member 10 carried thereby and means for moving one of said parts longitudinally by rotation, one of the said members exerting a pressure against said valve-frame in the direction of its seat and means for detachably holding the member 11 in a fixed position.

JAMES H. JONES.

Witnesses:
PAUL P. WILCOX,
R. C. MITCHELL.